US005129100A

United States Patent [19]

Caporizzo et al.

[11] Patent Number: 5,129,100

[45] Date of Patent: Jul. 7, 1992

[54] AGILE OUTPUT BAND PASS FILTER FOR AGILE UP CONVERTER

[75] Inventors: Louis Caporizzo, North Wales; Clyde Robbins, Maple Glen; Daniel Marz, Dresher, all of Pa.

[73] Assignee: General Instrument Corp., Hatboro, Pa.

[21] Appl. No.: 735,171

[22] Filed: Jul. 23, 1991

Related U.S. Application Data

[63] Continuation of Ser. No. 402,911, Sep. 5, 1989, abandoned.

[51] Int. Cl.[5] .......................... H04B 1/04; H04B 1/06; H04H 1/02

[52] U.S. Cl. .................................... 455/118; 455/266; 455/339; 455/340; 455/6.2; 455/191.1; 358/86

[58] Field of Search ........................................ 455/3-6, 455/17, 20, 23, 97, 103, 118, 120, 125, 179, 185-186, 191, 266, 306-307, 339-340; 358/86; 333/17.1

[56] References Cited

U.S. PATENT DOCUMENTS

| | | | |
|---|---|---|---|
| 4,160,212 | 7/1979 | Barquist, Jr. et al. | 455/22 |
| 4,234,965 | 11/1980 | Bickley et al. | 455/191 |
| 4,270,212 | 5/1981 | Furukawa | 455/179 |
| 4,368,541 | 1/1983 | Evans | 455/197 |
| 4,435,841 | 3/1984 | Dobrovolny | 455/340 |
| 4,569,084 | 2/1986 | Takahama | 358/86 |
| 4,619,000 | 10/1986 | Ma | 455/340 |
| 4,723,306 | 2/1988 | Fuenfgelder et al. | 455/103 |
| 4,792,993 | 12/1988 | Ma | 455/339 |

*Primary Examiner*—Curtis Kuntz
*Assistant Examiner*—Andrew Faile
*Attorney, Agent, or Firm*—James & Franklin

[57] ABSTRACT

The need for replacing the dedicated external output filter each time a different channel is selected is eliminated through the use of a switchable array of low and high pass filters which forms a filter circuit which may be varied for use with any channel. The band pass of the filter is selected in accordance with the selected channel number. The channel number is decoded to actuate RF relays which switch selected filters into the circuit.

12 Claims, 1 Drawing Sheet

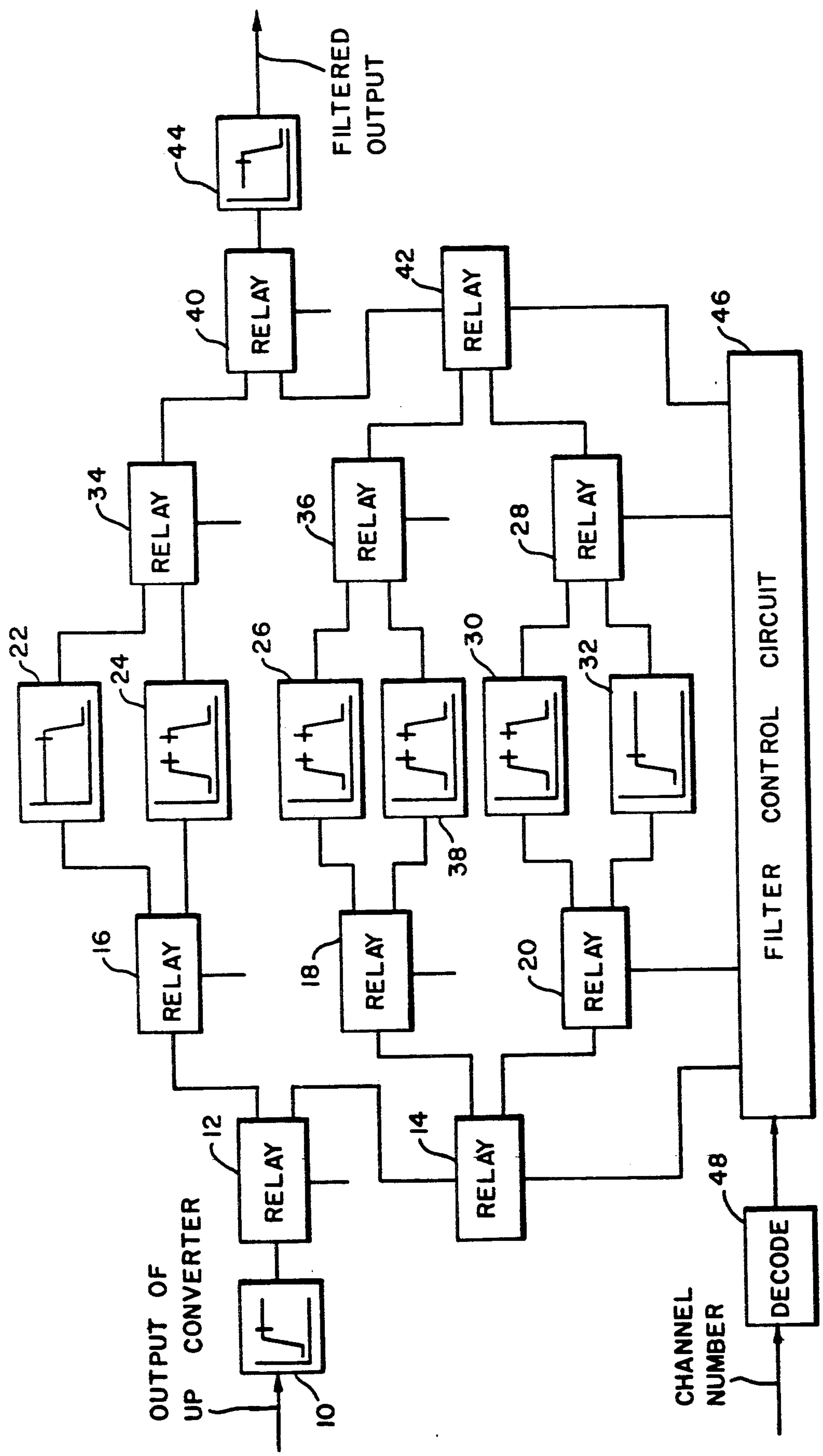
OUTPUT OF UP CONVERTER
10
12
RELAY
14
RELAY
16
RELAY
18
RELAY
20
RELAY
22
24
26
38
30
32
34
RELAY
36
RELAY
28
RELAY
40
RELAY
42
RELAY
44
FILTERED OUTPUT
46
FILTER CONTROL CIRCUIT
48
DECODE
CHANNEL NUMBER

AGILE OUTPUT BAND PASS FILTER FOR AGILE UP CONVERTER

This is a continuation of co-pending application Ser. No. 402,911 filed on Sep. 5, 1989 now abandoned.

BACKGROUND OF THE INVENTION

The present invention relates to up converters designed for use in the headend of a cable television distribution system and more particularly to an agile output band pass filter circuit for use in conjunction with an agile up converter, which enables the system operator use a single output filter circuit for all channels.

In the headend of a cable television distribution system, video programs are prepared for distribution by modulating a carrier of a frequency corresponding to the channel selected. This is accomplished by means of a video modulator and an up converter. The video modulator converts the video signal to an intermediate (IF) frequency signal. The up converter converts the IF signal to a signal at the selected channel frequency.

Up converters which can be programmed for use for any one of the eighty-six available channels per cable are known as "agile". The last portion in an up converter is an output filter which prevents unwanted frequencies from being coupled to the cable distribution system. Even with an agile up converter, a different dedicated output filter is needed for each channel selected because different channel frequencies require filters with different pass bands to successfully minimize spurious output and broadband noise. Hence, the system operator must physically change the output filter each time the up converter is set to a different channel frequency.

OBJECT OF THE INVENTION

In general, it is the object of our invention to provide an agile output band pass filter for use in conjunction with an agile up converter which eliminates the necessity for the system operator to change the dedicated output each time the channel is changed. In general, this is accomplished by utilizing an array of low pass filters and high pass filters which are operatively connectable in various configurations by a plurality of RF relays which are controlled in accordance with the channel selected.

It is, therefore, a prime object of the present invention to provide an agile output band pass filter for use with an agile up converter in the headend of a cable television distribution system.

It is another object of the present invention to provide an agile output band pass filter for an agile up converter which consists of an array of low pass filters and high pass filters which are selectively connectable to form a filter circuit.

It is another object of the present invention to provide an agile output band pass filter for an agile up converter wherein particular filters are selected in accordance with the channel number in order to form an aggrigate filter circuit with the required pass band.

SUMMARY OF THE INVENTION

In accordance with the invention, a cable TV up converter is provided comprising means for converting an intermediate frequency signal to a channel frequency signal for selected one of the plurality of channels. Channel selection means are provided. Variable pass band filter means are utilized along with filter means control means which are responsive to the channel selection means. The filter means comprises an array of different band pass filters and switching means responsive to said control means and effective, when actuated, to connect selected filters to the output of the converting means to vary the pass band of the filter means as a function of the selected channel.

The switching means preferably comprises a plurality of RF relay means. The filter means control means preferably comprises channel number decode means and means for actuating the RF relay means accordance with the output of the decoder.

In accordance with another aspect of the present invention, variable band output filter means is provided for use with an agile up converter capable of converting an intermediate frequency signal to a channel frequency signal and including channel selection means. The filter means includes filter means control means responsive to the channel select means. The filter means comprises an array of different band pass filters and switching means responsive to the control means and effective, when actuated, to connect selected filters to the output of the up converter to vary the pass band of the filter means as a function of the selected channel.

The switching means preferably comprises a plurality of RF relay means. The filter means control means preferably comprises channel number decode means and means for actuating the RF relay means in accordance with the output of the decoder.

To these and such other end which may hereinafter appear. The present invention relates to an agile output band pass filter for an agile up converter as described in the following specification, recited in annexed claims and illustrated in the accompanying drawing.

BRIEF DESCRIPTION OF THE DRAWING

The sole Figure is a schematic diagram of the agile output bandpass filter of the present invention.

DESCRIPTION OF THE PREFERRED EMBODIMENT

The present invention relates to a variable pass band output filter circuit designed for use in conjunction with an agile up converter at the headend of a cable television distribution system. The filter circuit of the present invention provides for excellent reduction of unwanted signal frequencies.

The selection of a filter pass band occurs in response to the selection of the channel. The system includes a circuit which decodes the selected channel number and simultaneously actuates the appropriate RF relays so that the pass band of the aggregate filter circuit is set in accordance with the selected channel. The use of agile up converters having output filters of the type of the present invention will enable the system operator to change the channel of the up converter without having to remove and replace the output filter.

A feature of this filtering system is that it reduces noise at the output of the system. The reduction of broadband noise is due to the fact that only the equivalent band of 17 channels (each channel is 6 MHz wide) are passed at any one time instead of the broadband output of 86 channels (each channel is 6 MHz wide).

With a system having a broad band output 86 channels wide, the degradation of carrier to noise is equal to ten log 86 or 19.34 dB. This can be compared to a situation where there is a band pass output 17 channels wide, where the degradation of the carrier to noise ratio is equal to 10 log 17 or 12.3 dB. Accordingly, it is possible to improve the carrier to noise ratio by 7.04 dB by appropriately band limiting the output of the up converter.

Not only will the present invention increase the carrier to noise ratio of the CATV headend, it will provide a different band pass response taylored specifically for each channel, eliminate the necessity for fixed tune filters and hence reduce the amount of space in the headend rack, as well as increasing the agility of the output filter section.

The figure illustrates the invention schematically. The input of the output band pass filter of the present invention is the output of the last modulator stage of the up converter. This input passes through a first high pass filter 10. The output of filter 10 is directed through RF relays 12, 14, 16, 18 and 20 to one or more of the low pass filter 22, band pass filters 24, 26, 28 and 30 or high pass filter 32. The output of these filters pass through one or more of the relays 34, 36, 38, 40 and 42 and ultimately through a low pass filter 44 which provides the filter circuit output.

Relays 10, 14, 16, 18, 20, 34, 36, 38, 40, and 42 are all tied by separate control lines to outputs of a filter control circuit 46. Circuit 46 actuates the appropriate relays such that the pass band of the aggregate filter is a function of the selected channel. The number of the selected channel is the input for a channel number decoder circuit 48. The output of decoder 48 forms the input to the filter control circuit 46. Decoder 48 and filter control circuit 46 are simple hardwired or programmable switching circuits which could be designed by any person skilled in the art.

By way of an example, filter 10 may be an high pass filter which passes all signals above 44 MHz. Filter 22 may be a low pass filter which passes all signals below 144 MHz. Filter 24 may be a band pass filter having a pass band between 124 and 228 MHz. Filter 26 may be a band pass filter which passes all signal frequencies between 208 and 312 MHz. Filter 28 may be a band pass filter which passes all frequencies in the band between the 292 and 396 MHz. Filter 30 may be a band pass filter which passes frequencies in band between 376 and 480 MHz. Filter 32 may be a high pass filter which passes frequencies over 480 MHz. Filter 44 may be a low pass filter which passes all frequencies below 564 MHz.

While the particular ratings of the filters given above are believed to work satisfactorily, same should not be considered a limitation on the present invention. Other filter selections may function equally well. It is well within the skill of the art to select the appropriate filters.

It should now be appreciated that the present invention relates to an agile output band pass filter for use with an agile up converter which eliminates necessity for the use of dedicated external output filters and substantially increases the carrier noise ratio of the up converter.

While only a single preferred embodiment of the present invention has been disclosed herein for purposes of illustration it is obvious that many variations and modifications could be made thereto. It is intended to cover all these variations and modification which forward in the scope of the present invention as set forth in the following claims:

We claim:

1. A cable TV up converter of the type generating a channel frequency signal for a selected one of a plurality of channels and an output representing the channel selected, said converter comprising variable band pass output filter means operably connected to receive the channel frequency signal and having an output, said variable band pass output filter means comprising a plurality of fixed filters of different pass bands, each having a signal input and a signal output, means for decoding said output representing the channel selected and filter means control means operably connected to said decoder means for receiving the output of said decoder means, said filter means control means selecting one of said fixed filters in accordance with said decoder means output and connecting said signal input of said selected fixed filter to receive said channel frequency signal and the output of said selected fixed filter to said filter means output, said filter means control means comprising an array of RF relays operably connectable in series to minimize insertion loss, said RF relay array comprising an input RF relay sub-array operably connected to receive said channel frequency signal and to connect same to the inputs of said fixed filters and an output RF relay sub-array operably connected between the outputs of said fixed filters and said filter means output, each of said RF relays in said input RF relay sub-array comprising a signal input, a control input operably connected to said decoder means output and first and second signal outputs, said input RF relay sub-array comprising first, second, third, fourth and fifth relays, said first relay having a signal input receiving said channel frequency signal, said second relay having a signal input connected to said first signal output of said first relay and signal outputs respectively connected to the inputs of first and second ones of said fixed filters respectively, said third relay having a signal input connected to the second signal output of said first relay and signal outputs connected to the signal inputs of said fourth and fifth relays respectively, said fourth relay having signal outputs connected to the inputs of third and fourth ones of said fixed filters respectively, and said fifth relay having signal outputs connected to the inputs of fifth and sixth ones of said fixed filters respectively.

2. The converter of claim 1, wherein each of said relays in said output RF relay sub-array comprises first and second signal inputs, a control input operably connected to the decoder means output and a signal output, said output RF relay sub-array comprising first, second, third, fourth and fifth relays, the signal inputs of said second relay being connected to the outputs of said first and second ones of said fixed filters respectively, the signal inputs of said fourth relay being connected to the outputs of said third and fourth ones of said fixed filter respectively, the signal inputs of said fifth relay being connected to the outputs of said fifth and sixth ones of said fixed filters respectively, the signals inputs of said third relay being connected to the signal outputs of said fourth and fifth relays respectively, and said signal inputs of said first relay being connected to the signal outputs of said second and third relays respectively.

3. The converter of claim 1 wherein said input RF relay sub-array is the mirror image of said output RF relay sub-array.

4. Variable pass band output filter means forming the output stage of an agile cable TV up converter of the type generating a channel frequency signal for a selected one of a plurality of channels and an output representing the channel selected, said output filter means being operably connected to receive the channel frequency signal, having an output and comprising a plurality of fixed filters of different pass bands, each having a signal input and a signal output, means for decoding said output representing the channel selected and filter means control means operably connected to receive the output of said decoder means, said filter means control means selecting one of said fixed filters in accordance with said decoder means output and connecting the signal input of said selected fixed filter to receive said channel frequency signal and the output of said selected fixed filter to said filter means output, said filter means control means comprising an array of RF relays operably connectable in series to minimize insertion loss, said RF relay array comprising an input RF relay sub-array operably connected to receive said channel frequency signal and to the inputs of said fixed filters and an output RF relay sub-array operably connected between the outputs of said fixed filters and said filter means output, each of said RF relays in input RF relay sub-array comprising a signal output, a control input operably connected to said decoder means output and first and second signal outputs, said input RF relay sub-array comprising first, second, third, fourth and fifth relays, said first relay having a signal input which receives said channel frequency signal, said second relay having a signal input connected to said first output of said first relay and signal outputs respectively connected to the inputs of first and second ones of said fixed filters respectively, said third relay having a signal input connected to the second signal output of said first relay and signal outputs connected to the signal inputs of said fourth and fifth relays respectively, said fourth relay having signal outputs connected to the inputs of third and fourth ones of said fixed filters respectively, and said fifth relay having signal outputs connected to the inputs of fifth and sixth ones of said fixed filters respectively.

5. The filter means of claim 4 wherein each of said RF relays in said output RF relay sub-array comprises first and second signal inputs, a control input operably connected to the decoder means output and a signal output, said output RF relay sub-array comprising first, second, third, fourth and fifth relays, the signal inputs of said second relay being connected to the outputs of first and second ones of said fixed filters respectively, the signal inputs of said fourth relay being connected to the signal outputs of third and fourth ones of said fixed filters respectively, the signal inputs of said fifth relay being connected to the outputs of fifth and sixth ones of said fixed filters, respectively, the signal inputs of said third relay being connected to the signal outputs of said fourth and fifth relays respectively, and said signal inputs of said first relay being connected to the signal outputs of said second and third relays respectively.

6. The filter means of claim 5, wherein said input RF relay sub-array is the mirror image of said output RF relay sub-array.

7. A cable TV converter of the type generating a channel frequency signal for a selected channel and comprising one of a plurality of channels and an output representing channel selected, and comprising variable band pass output filter means operably connected to receive the channel frequency signal and having an output, said variable band pass output filter means comprising a plurality of fixed filters of different pass bands, each having a signal input and a signal output, means for decoding said output representing the channel selected and filter means filter means operably connected to said decoder means for receiving the output of said decoder means, said filter means control means selecting one of said fixed filters in accordance with said decoder means output and connecting the signal input of said selected fixed filter to receive said channel frequency signal and the output of said selected fixed filter to said filter means output, said filter means control means comprising an array of RF relays, said array of RF relays comprising an input RF relay sub-array operably connected to receive said channel frequency signal and to connect same to the inputs of said fixed filters, said input RF relay sub-array comprising RF relays operably connectable in series.

8. The converter of claim 7 wherein said array of RF relays comprises an output RF relay sub-array operably connected between the outputs of said fixed filters and said filter means output, said output RF relay sub-array comprising RF relay, operably connectable in series.

9. The converter of claim 8 wherein said input RF relay sub-array is the mirror image of said output RF relay sub-array.

10. Variable pass band output filter means forming the output stage of an agile cable TV up converter of the type generating a channel frequency signal for a selected one of a plurality of channels and an output representing the channel selected, said output filter means being operably connected to receive the channel frequency signal, having an output and comprising a plurality of fixed filters of different pass bands, each having a signal input and a signal output means for decoding said output representing the channel selected and filter means control means operably connected to the output of said decoder means, said filter means control means selecting one of said fixed filters in accordance with said decoder means output and connecting the signal input of said selected fixed filter to receive said channel frequency signal and the output of said selected fixed filter to said filter means output, said filter means control means comprising an array of RF relays, said array of RF relays comprising an input RF relay sub-array operably connected to receive said channel frequency signal and to the inputs of said fixed filters, said input RF sub-array comprising RF relays operably connected in series.

11. The filter means of claim 10 wherein said array of RF relays comprises an output RF relay sub-array operably connected between the outputs of said fixed filters and said filter means output, said output RF sub-array comprising RF relays operably connectable in series.

12. The filter means of claim 11 wherein said input RF relay sub-array is the mirror image of said output RF relay sub-array.

* * * * *